J. M. JONES.
WEEDING AND TRANSPLANTING IMPLEMENT.
No. 182,367. Patented Sept. 19, 1876.
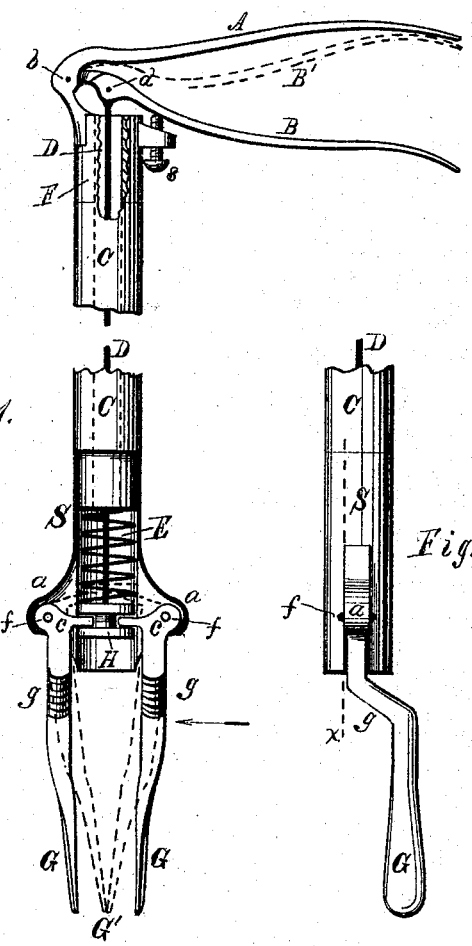

UNITED STATES PATENT OFFICE.

JOHN M. JONES, OF PALMYRA, NEW YORK.

IMPROVEMENT IN WEEDING AND TRANSPLANTING IMPLEMENT.

Specification forming part of Letters Patent No. 182,367, dated September 19, 1876; application filed November 1, 1875.

*To all whom it may concern:*

Be it known that I, JOHN M. JONES, of Palmyra, in the county of Wayne and State of New York, have invented a new and useful Weeding and Transplanting Implement; and I do hereby declare that the following is a full, clear, and exact description thereof, reference being had to the accompanying drawings, making a part of this specification, in which—

Figure 1 is a sectional side elevation of my invention. Fig. 2 is an elevation of the lower portion of the implement, looking in the direction of the arrow in Fig. 1.

The object of this invention is to provide a cheap and efficient implement, to be used in weeding garden and flower beds, where the plants have acquired any considerable growth, and which may also be employed as a transplanter for small roots.

It consists, mainly, in the employment of two somewhat duck-bill-shaped blades, one or both of which are hinged to a hollow staff, and connected loosely to a governing-rod, connected to a lever hinged at the top of the staff, and running out at right angles, or nearly so, therefrom, under a fixed handle, occupying a corresponding position.

I employ a staff, C, of a convenient length. This may be made of wood, or a metallic tube may be used. If the former is employed, it should be bored out to allow the rod D to work freely through it. The ferrule F, to which the handle A is rigidly fixed, is made to turn upon the upper end of the staff or tube C. The handle B is hinged to A at *b*, and to the said swinging handle B is hinged the upper end of the rod D. The lower end of the rod is provided with a grooved head, H. The socket-ferrule S is formed with projecting hollow ears *a*, on opposite sides, near the lower end, within which the shanks of the duck-bill blades G are hinged at *f*. These shanks are each provided with a lug, *c*, projecting from near their hinged joint, and they rest within the groove in the periphery of the head H.

It will be seen that the spring E forces the head down, and with it the handle B, and also the blades G, to their normal or open position, as shown in full lines.

The staff C is made fast within the socket S, but with the loose socket F, and by means of the groove in the head H, the relative position of the blades, and the handle A and lever B, may be adjusted, as convenience may require.

A rubber or other suitable spring may be substituted for the spiral spring E.

The set-screw *s* is designed to govern the spread or opening of the blades G, which should not exceed a parallelism of their inner faces, when the implement is used for transplanting. When used for some kinds of weeding it may be considerably less.

A tolerably good effect might be produced by only hinging one blade to the socket or to the staff, and having the other fixed thereto.

The object of the offset in the shank of the blades at *g* is more especially designed to adapt the implement to transplanting.

The staff is carried in the left hand, and guided by it, while the right rests upon the handle A, with the fingers encircling the lever B. The blades G are placed astride the plant or weed to be withdrawn, and the implement forced downward sufficiently to insure a firm hold upon the root. The lever B is then raised by the grasp of the right hand, whereby the blades G are forced toward the closed position, indicated by the dotted lines G', Fig. 1, and made to firmly clamp the root, which, it will be seen, will be more firmly clamped the harder it is necessary to lift on the lever B to withdraw the root or plant.

It might be desirable to provide each implement with two sets of blades, G, one set made wide, to be used for transplanting, and the other narrow, for weeding.

It will be seen that with this little implement a lady may weed her flower-beds without staining or soiling her fingers in the least by the leaves and earth. It also relieves the great strain upon the fingers, which is unavoidable in weeding by hand.

I claim—

1. In combination with the grooved or hollow staff C, and fixed handle A, projecting therefrom at right angles, or nearly so, the hinged lever B, rod D, and blades G, as and for the purposes shown and described.

2. In combination with the spring E and head H, the rod D, staff C, handle A, and lever B, arranged to operate conjointly, substantially as and for the purposes set forth.

3. In combination with the swiveled staff C and grooved head H, the hinged blade or blades G, as and for the purposes set forth.

JOHN M. JONES.

Witnesses:
WM. S. LOUGHBOROUGH,
E. B. WHITMORE.